March 1, 1966  R. L. WEAVER ETAL  3,237,788
SILO UNLOADER
Filed March 4, 1964
2 Sheets-Sheet 1
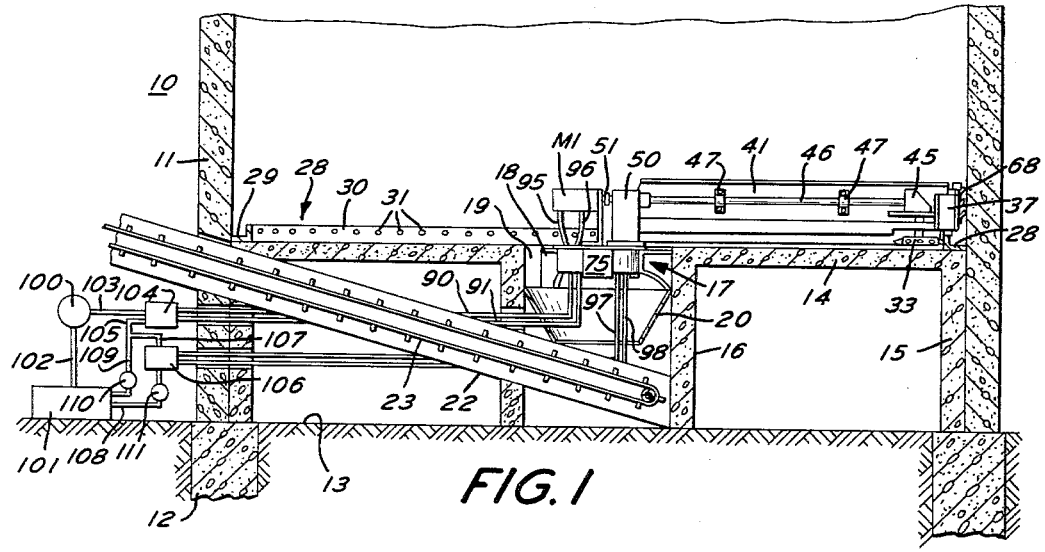
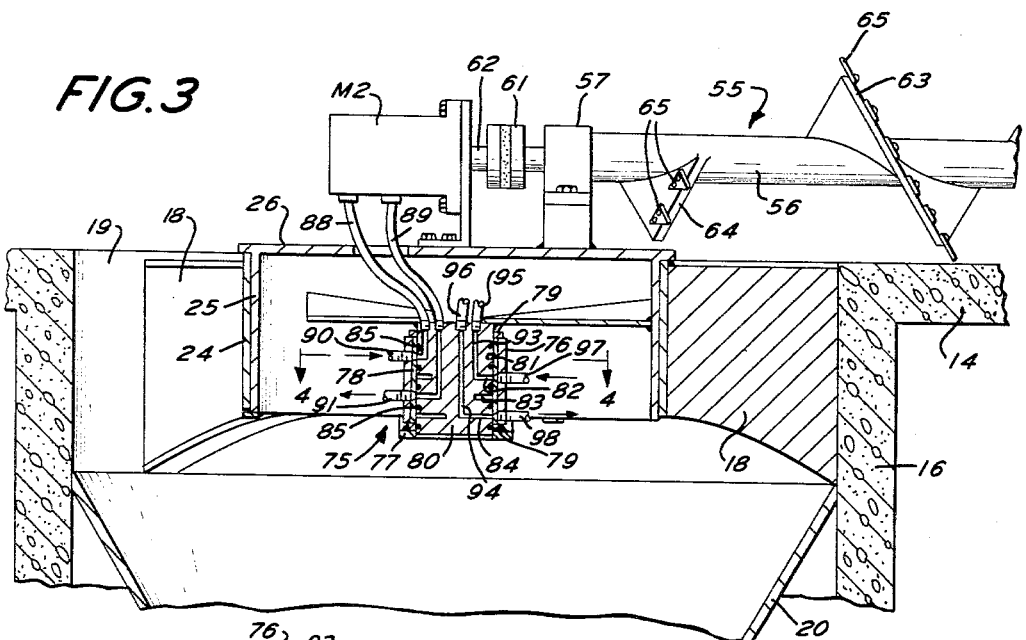
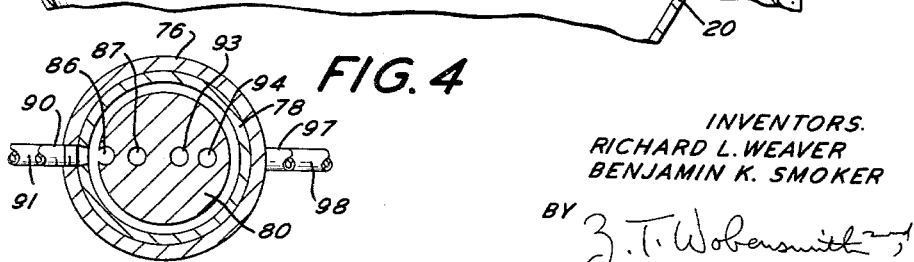
INVENTORS.
RICHARD L. WEAVER
BENJAMIN K. SMOKER
BY
ATTORNEY

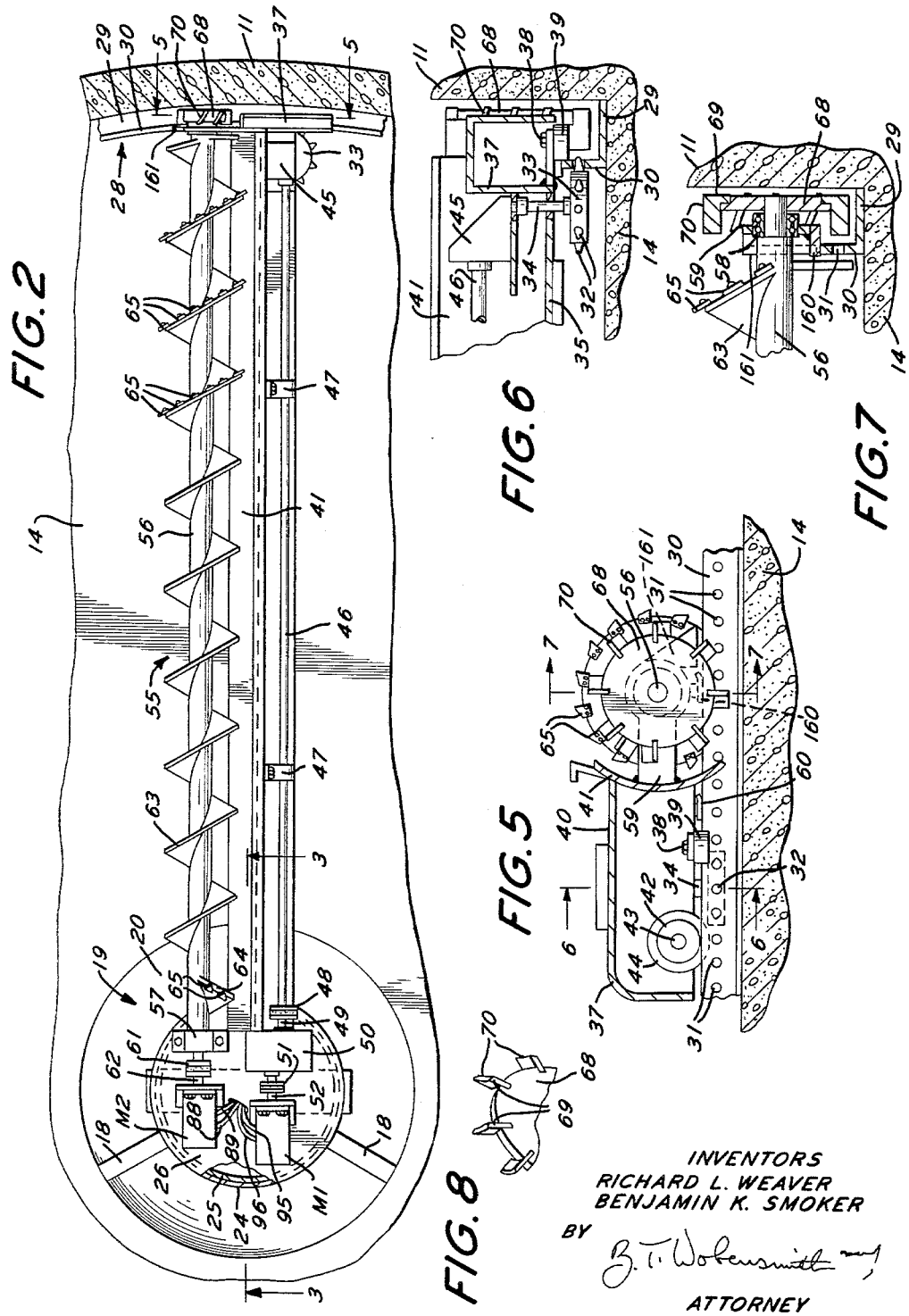

United States Patent Office 3,237,788
Patented Mar. 1, 1966

3,237,788
SILO UNLOADER
Richard L. Weaver, R.D. 5, Lebanon, Pa. 17042, and
Benjamin K. Smoker, R.D. 3, Myerstown, Pa. 17067
Filed Mar. 4, 1964, Ser. No. 349,312
11 Claims. (Cl. 214—17)

This invention relates to apparatus for unloading silos, and more particularly to apparatus at the bottom of the silo for separating and delivering to the exterior of the silo, as desired, silage stored in the silo.

Various unloading devices have heretofore been proposed but none of these have proven wholly satisfactory. Prior devices in numerous instances had too many moving parts and were difficult to service in the event of a breakdown. Considerable difficulty has been encountered with other unloading devices heretofore available because of the tendency of the devices to jam. In other types of unloading devices the separation of the portion of silage to be unloaded was not accomplished expeditiously or had excessive power requirements.

It is the principal object of the present invention to provide a silo unloader which is simple in construction, is reliable in operation, and is free from objectionable features of silo unloaders heretofore available.

It is a further object of the present invention to provide a silo unloader which may be easily installed in new silos, or installed in silos now in use with a minimum of change or reconstruction.

It is a further object of the present invention to provide a silo unloader which includes an auger, and driving and advancing structure for the auger both of which are operated from an exterior power supply.

It is a further object of the present invention to provide a silo unloader in which an auger is provided for cutting and impelling the material to be removed together with mechanism for advancing the auger in a horizontal rotary path in the interior of the silo.

It is a further object of the present invention to provide a silo unloader having an auger and advancing structure for removing the auger in a horizontal rotary path, separate but related driving motors being provided for the auger and for the advancing mechanism.

It is a further object of the present invention to provide a silo unloader which includes an auger and advancing means for impelling the auger in a horizontal rotary path together with improved components forming part of the advancing mechanism for eliminating the likelihood of jamming during the advancing movement.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical central sectional view of the bottom portion of a silo having the unloader of the present invention mounted therein, the hydraulic circuit being shown diagrammatically;

FIG. 2 is a top plan view of the auger and its driving and advancing mechanism;

FIG. 3 is a vertical sectional view, enlarged, taken approximately on the line 3—3 of FIG. 2;

FIG. 4 is a horizontal sectional view taken approximately on the line 4—4 of FIG. 3;

FIG. 5 is a vertical sectional view, enlarged, taken approximately on the line 5—5 of FIG. 2;

FIG. 6 is a vertical sectional view taken approximately on the line 6—6 of FIG. 5;

FIG. 7 is a vertical sectional view, taken approximately on the line 7—7 of FIG. 5; and FIG. 8 is a fragmentary perspective view of the auger end cutter wheel.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated the lower part of a silo is shown at 10, having a vertical cylindrical wall 11 on a foundation 12 at a level 13. The silo 10 is preferably of the type which is closed or sealed to prevent the entrance of air.

The lower end of the silo 10 has a horizontal closure wall or floor 14 with a downwardly extending outer supporting wall 15 and a central downwardly extending cylindrical wall 16, terminating at the level 13.

Within the wall 16 a bridging section 17 is provided having spaced radial supports 18 across a space 19 with a hopper 20 therebelow. The bottom of the hopper 20 is connected for delivery of its contents to the interior of an enclosed housing 22 of a conveyor 23. The housing 22 is closed to prevent the free influx of air to the space within the wall 16 and therefrom to the interior of the silo 10.

The radial supports 18 have a cylindrical liner 24 fixedly carried thereby around their inner ends. The liner 24 carries a rotatable central motor support which has a cylindrical sleeve 25, and a top frame plate 26.

The floor 14 inwardly of the wall 11 has a circular track 28 therearound with a horizontal track flange 29 and a vertical track flange 30. The vertical flange 30 has a plurality of openings 31 for engagement by pins 32 of a driving wheel 33 which is located inwardly of the flange 30 and is carried on a vertical shaft 34.

The shaft 34 is mounted in a horizontal frame plate 35 which is secured to and extends between an outer housing 37 and the frame plate 26.

The frame plate 35 has a vertical shaft 38 carried thereby with a holding roller 39 mounted thereon and bearing on the outer face of the flange 30 to retain the wheel 33 against separation from the flange 30.

The housing 37 has an upper section 40 with an auger guide plate 41 therealong and extending parallel to the frame plate 35. Within the interior of the outer housing 37 a support wheel 42 is provided on a shaft 43 and has a flanged rim 44 disposed on the inner side of the track flange 30 to prevent the auger 55 moving toward the wall 11.

The shaft 38 is connected by bevel gearing within a gear housing 45 to a drive shaft 46. The drive shaft 46 is supported by a plurality of spaced brackets 47 carried by the auger guide plate 41 and is connected by a flexible coupling 48 to the output shaft 49 of a speed reducer 50. The speed reducer 50 is connected by a flexible coupling 51 to the output shaft 52 of an auger advancing motor M1.

The motor M1 is mounted on the frame plate 26 and is preferably a reversible fluid operated motor to which driving fluid under pressure is supplied as hereinafter pointed out.

An auger 55 is provided having an auger shaft 56 carried at its inner end in a sealed bearing 57 mounted on the frame plate 26 and supported near its outer end in a sealed bearing 58 which is carried by a bracket plate 59 secured to the auger guide plate 51. The housing 37 has a supporting shoe 60 and the bracket plate 59 has a supporting shoe 160 which are slidable along the top edge of the track flange 30. The auger shaft 56 at its inner end is connected by a flexible coupling 61 to the output shaft 62 of an auger driving motor M2.

The motor M2 is mounted on the frame plate 26 and is preferably a reversible fluid operated motor to which driving fluid under pressure is supplied as hereinafter pointed out.

The auger shaft 56 for the major portion of the distance between the bearings 58 and 57 has a helical blade 63 of a hand to move material inwardly toward the space 19, a reversely directed helical blade 64 being provided at the inner end for discharge of material at the space 19. The blades 63 and 64 along the periphery thereof have a plurality of cutters 65 secured thereto for cutting the material thereabove in the silo 10 for removal.

The auger shaft 56 at the outer end of the blade 63 has an auxiliary radially extending cutter 66 for cutting and clearing away material just beyond the blade 63.

The auger shaft 56, at the outer end thereof and beyond the bearing 58, has a cutter wheel 68 secured thereto with cutters having radial cutter edges 69 extending outwardly from the outer face of the cutter wheel 68 and curved peripheral cutter edges 70 of a length to overlap the wheel 68, partially overlap the bearing 58 and extend toward the blade 63. The bracket plate 59 has a plow plate 161 extending forwardly therefrom for clearing away material above the track 30 which may remain as the wheel 68 advances.

In order to supply fluid under pressure for motor operation and return of the fluid a fluid coupling 75 (see FIG. 3) can be employed.

The fluid coupling 75 includes an outer cylindrical housing 76 fixedly mounted on a supporting plate 77 and having an internal hollow cylindrical bearing ring 78.

Within the ring 78 an inner plug 80 is provided relatively rotatable with respect to the housing 76 held by positioning rings 79 and having vertically spaced annular grooves 81, 82, 83 and 84, with packings 85, such as O-rings on the periphery of the plug 80 and engaging the bearing ring 78 to prevent fluid leakage between the grooves.

From the grooves 81 and 83, passageways 86 and 87 in the plug 80 extend to the top of the plug 80 and have fluid connections 88 and 89 connected respectively to the motor M2 for selective use for supply and return of fluid under pressure. The housing 76 has pipes 90 and 91 extending thereto and communicating respectively with the grooves 81 and 83.

From the grooves 82 and 84, passageways 93 and 94 in the plug 80 extend to the top of the plug and have fluid connections 95 and 96 connected respectively to the motor M1 for selective use for supply and return of fluid under pressure. The housing 76 has pipes 97 and 98 extending thereto, and communicating respectively with the grooves 82 and 84.

A pump 100, driven in any desired manner, is provided connected to a sump 101 by a pump inlet pipe 102. From the pipe 102, a supply pipe 103 extends to a control valve 104 having a discharge 105. The valve 104 is of well known type for positioning for direct or for reverse supply and return of fluid to the pipes 90 and 91, or for a neutral or bypass action.

A control valve 106 of the same type as the valve 104 is provided to which a supply pipe 107 is connected, the pipe 107 being connected to the pipe 105. The valve 106 can be positioned for direct or for reverse supply and return of fluid to the pipes 97 and 98, or for a neutral or bypass action. From the valve 106 a return pipe 108 extends to the sump 101. The pipe 105 has a fluid connection 109 to the sump 101 with an adjustable needle valve 110 interposed therein for further control of the motor M1. The pipe 108 also has an adjustable needle valve 111 interposed therein for further control of the motor M2. The pipes 90 and 91 and the pipes 97 and 98 can extend through the wall 16, the wall 15 and the wall 11 with the control valves 104 and 106, and the adjustable valves 110 and 111 accessible from the exterior of the silo 10 for selective adjustment and with the pump 100 accessible for maintenance.

The mode of operation will now be pointed out, for removal of the stored contents of the silo 10. The pump 100 is actuated to supply fluid under pressure through the pipe 103 to the valve 104. The valve 104 is set to a position for forward operation and to supply pressure fluid through the pipe 90 and the fluid coupling 75 and the pipe 88 to the motor M2 to rotate the same. Fluid from the motor M2 is delivered through the pipe 89 and the pipe 91 to the valve 104.

Rotation of the motor M2 is effective through the shaft 62, the coupling 61 and the shaft 56 for rotating the auger including the blades 63 and 64 with their cutters 65. As the shaft 56 is rotated the cutter wheel 68 is also rotated and cuts a path in and near the track 30 to permit the further advance in a counterclockwise direction as seen in FIG. 2. Rotation of the auger blade 63 cuts away the stored material in the silo 10 therealong and causes material to be advanced inwardly toward the blade 64. The blade 64, by its reversing positioning, directs downward discharge of the material at the space 19 into the hopper 20 for removal by the conveyor 23 in the conveyor housing 22.

The fluid discharged from the motor M2 for this particular set of conditions passes through the pipe 105 and the pipe 107 to the valve 106. Assuming also that the valve 106 is set for normal forward operation the fluid is supplied therefrom through the pipe 97 to the fluid coupling 75 and from the coupling 97 through the pipe 95 to the motor M1 to rotate the same. Fluid from the motor M1 is delivered through the pipe 96 and the pipe 98.

Rotation of the motor M1 is effective through the shaft 52, the coupling 51, the speed reducer 50, the shaft 49, the coupling 48, the shaft 46 and gears in the gear housing 45 to rotate the shaft 34 and the driving wheel 33 carried thereby. The successive engagement of the pins 32 on the wheel 33 at the flange openings 31 slowly advances the assembly which is carried on the top plate 25 at one end and on the track 28 at the other end in a counterclockwise direction as seen in FIG. 2. This advance brings the auger blades 63 and 64 into contact with the material in the silo 10, so that it is cut away for removal.

The fluid from the motor M1 delivered through the pipe 98 and the valve 106 passes through the pipe 108 to the sump 101.

If for any reason it is necessary or desirable to reverse the direction of rotation of either the motor M2 or the motor M1 this may be effected by positioning of the valves 104 and/or 106.

It will also be seen that by reason of the delivery of the fluid discharge from the valve 104 in series through the valve 106 if the auger is slowed up for any reason this also tends to slow up the operation of the motor M1 which effects the advancing.

Furthermore by adjustment of the valves 110 and 111, even to the extent of closing the valve 110, the relative distribution of pressure fluid between the motors M2 and M1 may also be further adjusted.

We claim:
1. A silo unloader for a silo having an upright wall and a bottom floor with a central opening comprising, for bottom unloading of the silo,
   a supporting member at the central portion of said opening with a delivery space therearound,
   a circular track extending around the floor spaced inwardly of said wall and having a flange in closely spaced relation to said wall,
   an auger member mounted at one end on said supporting member for delivery of material to said delivery space, a first driving motor for said auger member carried by said supporting member, means for supporting the other end of the auger member on said track, said auger member having a track clearing member horizontally movable therewith, members for advancing said auger member in a rotary path, said members including a driving wheel having a plurality of peripheral projections engaging in openings in said flange at one face thereof, a second driving motor carried by said auger member, and operating connections between said second driving motor and said driving wheel, said track clearing member being a cutter wheel disposed outwardly of and in superposed relation to said track and continguous to said upright wall, and said cutter wheel having peripherally disposed cutting edges movable in the space between said track and said upright wall and above the top plane of the flange.

2. A silo unloader as defined in claim 1 in which said cutter wheel has radially disposed cutting edges movable in closely spaced relation to said upright wall.

3. A silo unloader as defined in claim 1 in which a flanged supporting wheel is provided in engagement with said track rearwardly of said cutter wheel.

4. A silo unloader as defined in claim 1 in which a holding wheel is provided in opposed relation to said driving wheel and engaging the opposite side face of said flange.

5. A silo unloader for a silo having an upright wall and a bottom floor with a central opening comprising, for bottom unloading of the silo, a supporting member at the central portion of said opening with a delivery space therearound, a circular track extending around the floor spaced inwardly of said wall, an auger member mounted at one end on said supporting member for delivery of material to said delivery space, a first driving fluid motor for said auger member carried by said supporting member, members for supporting the other end of the auger member on said track, said auger member having a track clearing member horizontally movable therewith, and members for advancing said auger member in a rotary path, said members including a driving wheel engaging said track, a second driving fluid motor, and a pump for supplying fluid under pressure for operating said motors, and operating connections between said second driving motor and said driving wheel.

6. A silo unloader as defined in claim 5 in which a fluid coupling at said central opening is interposed between said pump and said motors.

7. A silo unloader as defined in claim 5 in which at least one of said motors has a reversing valve in a fluid supply line connected thereto.

8. A silo unloader as defined in claim 5 in which said motors are disposed in series, a bypass connection is provided around said second motor, and a flow control valve is interposed in said bypass connection.

9. A silo unloader as defined in claim 5 in which said motors are disposed in series with said first motor disposed ahead of said second motor, said motors have reversing valves for reversing their direction of movement, and at least one of said motors has a flow control valve in the discharge connection thereof.

10. A silo unloader for a silo having an upright wall and a bottom floor with an opening comprising, for bottom unloading of the silo, a supporting member at said opening, a circular track spaced outwardly from and extending around said opening, an auger member mounted at one end on said supporting member for delivery of material to said opening, a first driving fluid motor for rotating said auger member about its own axis, means for supporting the auger member on said track, members for advancing said auger member in a rotary path, said members including a driving means engaging said track, a second driving fluid motor, operating connections between said second driving fluid motor and said driving means, and means for supplying fluid under pressure to the first and second driving fluid motors including control means for controlling and regulating the fluid supply to said motors for independent operation of each motor.

11. A silo unloader as defined in claim 10 and wherein said control means includes means for enabling the independent operation of each motor in forward, neutral and reverse and for adjusting the relative distribution of the pressure fluid of the fluid supply between the motors.

References Cited by the Examiner
UNITED STATES PATENTS

| | | | |
|---|---|---|---|
| 2,895,626 | 7/1959 | Bier | 214—17 |
| 2,914,198 | 11/1959 | Hein | 214—17 |
| 3,075,658 | 1/1963 | Neighbour | 214—17 |
| 3,079,016 | 2/1963 | Dretzke | 214—17 |
| 3,121,501 | 2/1964 | Laidig | 214—17 |

GERALD M. FORLENZA, *Primary Examiner.*

HUGO O. SCHULTZ, *Examiner.*

R. G. SHERIDAN, *Assistant Examiner.*